United States Patent [19]

Witkewitz et al.

[11] Patent Number: 5,158,790
[45] Date of Patent: Oct. 27, 1992

[54] L-CARVONE ENHANCED FRUIT FLAVORED CHEWING GUM

[75] Inventors: David L. Witkewitz, Bridgeview; Lindell C. Richey, Lake Zurich; Sharon D. Thomas, Chicago, all of Ill.

[73] Assignee: Wm. Wrigley, Jr. Company, Chicago, Ill.

[21] Appl. No.: 761,322

[22] Filed: Sep. 17, 1991

[51] Int. Cl.⁵ .............................................. A23G 3/30
[52] U.S. Cl. ....................................... 426/3; 426/534; 426/650; 426/651
[58] Field of Search ....................... 426/3, 4, 5, 6, 650, 426/651, 534

[56] References Cited

U.S. PATENT DOCUMENTS

| | | | |
|---|---|---|---|
| 4,948,595 | 8/1990 | Patel et al. | 426/3 |
| 4,988,518 | 1/1991 | Patel et al. | 426/5 |
| 5,017,385 | 5/1991 | Wienecke | 426/5 |
| 5,041,294 | 8/1991 | Patel | 426/3 |

Primary Examiner—Steven Weinstein
Assistant Examiner—Jean L. Aberle
Attorney, Agent, or Firm—Willian Brinks Olds Hofer Gilson & Lione

[57] ABSTRACT

A quantity of about 0.5–4.0% by weight of L-carvone is added to fruit flavors used in chewing gum, especially bubble gum, to provide a chewing gum having increased flavor impact, increased sweetness and prolonged flavor duration. The L-carvone enhances the fruit flavor in these respects without imparting a separate and different flavor to the chewing gum.

20 Claims, 2 Drawing Sheets

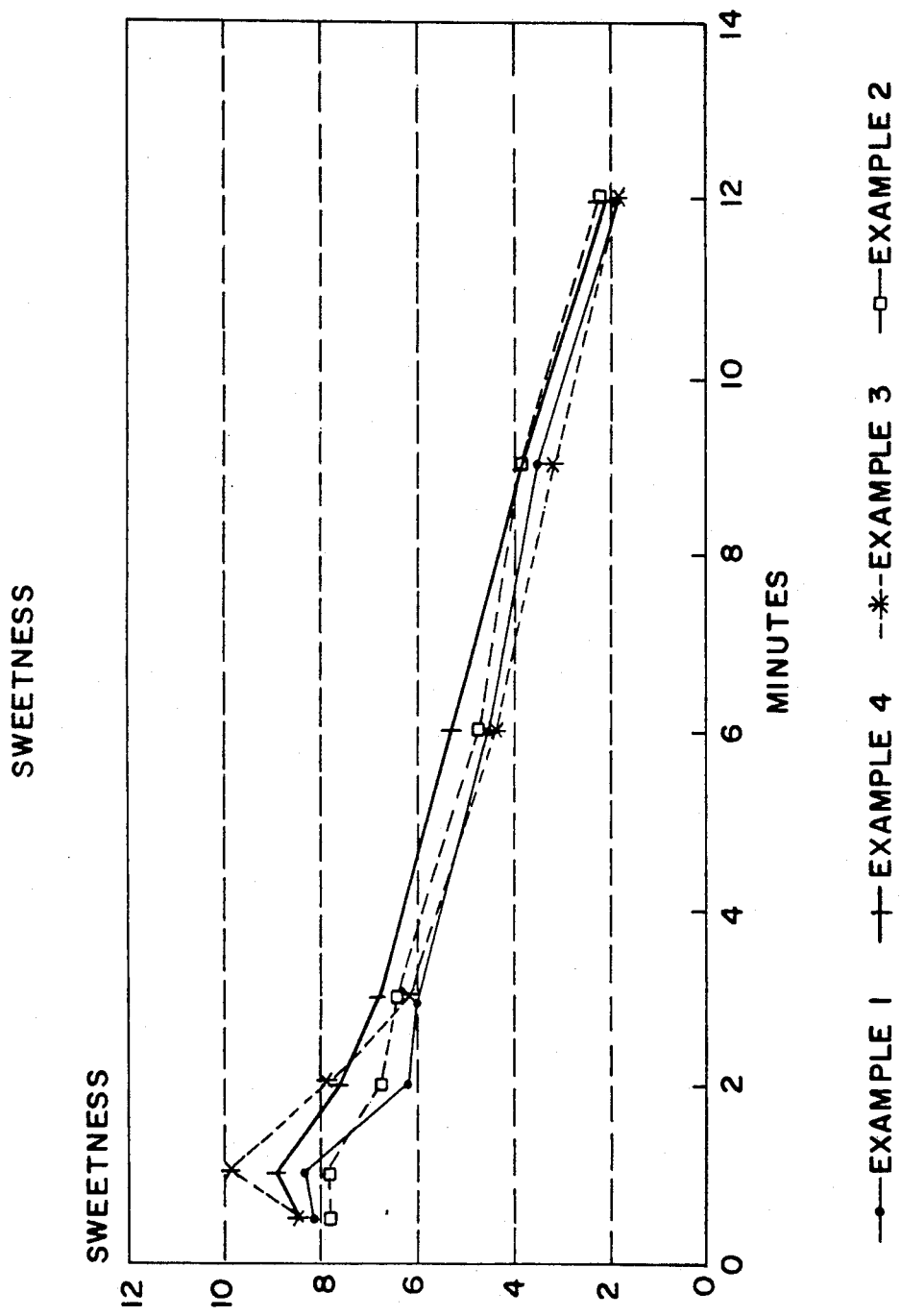

L-CARVONE ENHANCED FRUIT FLAVORED CHEWING GUM

FIELD OF THE INVENTION

This invention relates to a fruit flavored chewing gum composition which utilizes a small amount of L-carvone to enhance the impact and extend the duration of the fruit flavor. This invention also relates to a method of preparing a fruit flavored chewing gum.

BACKGROUND OF THE INVENTION

The use of fruit flavors in chewing gum has become very common, especially in bubble gum. Fruit flavors typically contain a combination of fruit esters and may contain orange oil, lemon oil or other natural oils. Fruit flavors used in chewing gum include, but are not limited to, banana, cherry, apple, pineapple, grape, strawberry, and blends including commonly known tutti frutti and bubble gum flavors.

Fruit esters tend to release from chewing gum very quickly causing the chewing gum to have a relatively short flavor duration. Also, fruit esters typically have a light flavor quality, causing the chewing gum to have a low flavor impact. The use of fruit oils such as orange and lemon oil, or certain other flavor oils such as clove oil and oil of wintergreen, tends to increase the duration and impact of the fruit flavors to some extent. However, there is still a need or desire in the chewing gum industry for further enhancement of fruit flavor impact and duration.

Various techniques are known in the art for enhancing chewing gum flavors generally, and some of these techniques have been applied to fruit flavors. U.S. Pat. No. 4,478,865 discloses the use of sulfurcontaining terpenes for enhancing the flavor of citrus fruits, especially grapefruit. EPO Patent Application 0167376 discloses a carbonate derivative of pineapple ketone flavor which gives chewing gum a longer lasting pineapple flavor, than pineapple ketone.

PCT Publication WO 90/06689 discloses the use of spices to extend the flavor of chewing gum, including gum which is flavored with citrus oils, fruit essences, etc. U.S. Pat. No. 4,948,595 discloses the use of small amounts of spearmint flavor to enhance the flavor of peppermint-flavored chewing gum. U.S. Pat. No. 4,889,726 discloses the use of cocoa powder to enhance the flavor of mint-flavored chewing gum.

The following U.S. Pat. Nos. disclose the enhancement of fruit flavors using various chemicals: 3,869,554; 3,875,307; 3,917,870; 3,920,752; 3,976,801; 3,982,009; 3,984,579; 4,031,257; 4,070,491; 4,385,072; 4,435,428; 4,470,963; 4,481,221; 4,525,364; 4,548,821 and 4,568,538.

SUMMARY OF THE INVENTION

The present invention relates to a method of enhancing the sweetness and flavor of a fruit-flavored chewing gum by adding a minor amount of L-carvone to the fruit flavor. Preferably, the L-carvone is mixed with fruit flavor separately before the fruit flavor is added to the chewing gum. The invention also includes the fruit flavored chewing gum with L-carvone added in a minor amount.

In order to enhance the sweetness and fruit flavor, the L-carvone is added in a quantity which is small compared to the overall quantity of fruit flavor. It has been found that the presence of a small amount of L-carvone, which is commonly known to be the major component of spearmint oil, strengthens and prolongs the fruit flavor and sweetness without otherwise changing the overall chewing gum flavor. When added to fruit flavor in the quantities contemplated by the invention, L-carvone will not impart a spearmint or other separate flavor to the chewing gum. Instead, the L-carvone enhances the fruit flavor already present.

A typical bubble gum or other fruit-flavored gum contains fruit flavor in an amount of about 0.1% to about 15% by weight of the chewing gum, more commonly about 0.2–5% by weight of the chewing gum and most commonly about 0.5–2.5% by weight of the chewing gum. The preferred amount of fruit flavor increases with the amount of base in the gum, which can range from about 5–95% by weight. More commonly, the amount of base is about 20–35% by weight. At base levels of about 20–26% by weight, the typical fruit flavor level is about 0.5–1.5% by weight. At base levels of about 26–35% by weight, the typical fruit flavor level is about 1.5–2.5% by weight.

In order to enhance the fruit flavor in accordance with the invention, the L-carvone is added in an amount of about 0.5–4.0% based on the weight of the fruit flavor, more preferably about 1–3% based on the weight of the fruit flavor and most preferably about 1.5% based on the weight of the fruit flavor.

With the foregoing in mind, it is a feature and advantage of the invention to provide an improved method of enhancing the impact of fruit flavor in bubble gum and other fruit flavored chewing gum, without imparting a separate flavor to the chewing gum.

It is also a feature and advantage of the invention to extend the duration of fruit flavor in bubble gum and other fruit-flavored chewing gum.

It is also a feature and advantage of the invention to provide an improved fruit flavored chewing gum composition having enhanced flavor impact and prolonged flavor duration.

The foregoing and other features and advantages will become further apparent from the following detailed description of the presently preferred embodiments, when read in conjunction with the accompanying examples and figures. It should be understood that the detailed description and examples are illustrative rather than limitative, the scope of the invention being defined by the appended claims and equivalents thereof.

BRIEF DESCRIPTION OF THE FIGURES

FIG. 2 indicates the sweetness intensity as a function of time for fruit-flavored chewing gum containing various minor levels of L-carvone. This figure also reflects the results of tests performed in Examples 1–4.

DETAILED DESCRIPTION OF THE PRESENTLY PREFERRED EMBODIMENTS

Figure 1:
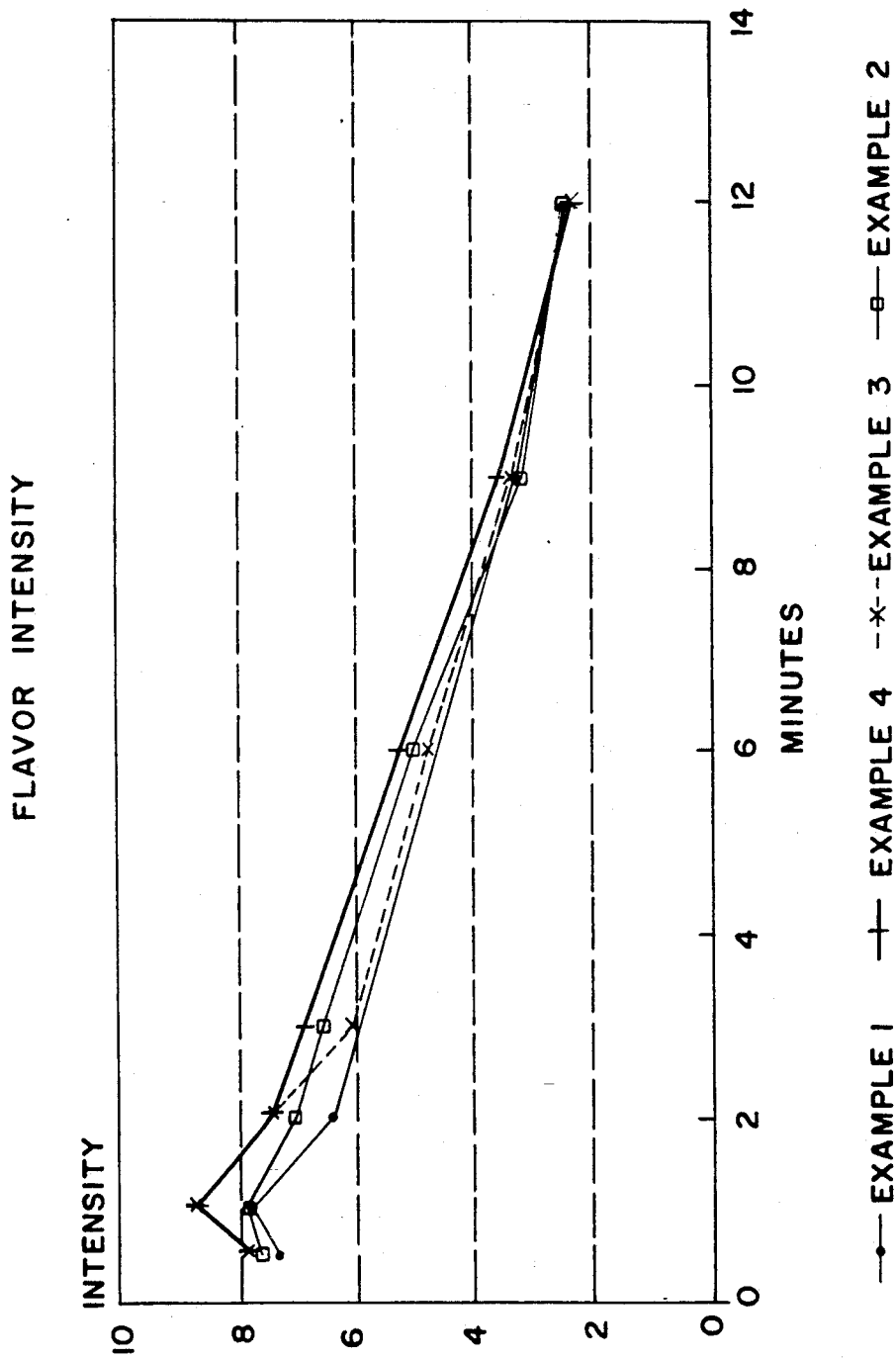
FIG. 1 indicates the flavor intensity as a function of time for fruit-flavored gum containing various minor levels of L-carvone as a flavor enhancer. This figure reflects the results of test preformed in Examples 1–4.

Spearmint oil taken by itself has a warm, mint taste that is decidedly separate and different from fruit flavors. Nevertheless it has been found that L-carvone, the major component of spearmint oil, enhances and prolongs the sweetness and flavor of fruit-flavored chewing gum when used in minor quantities, without imparting a separate and different flavor to the chewing gum. Although various types of spearmint oil or modified spearmint oil may alternatively be utilized, it is preferred to use L-carvone without other spearmint oil ingredients.

In accordance with invention, L-carvone can be used to enhance and prolong the sweetness and flavor of any fruit-flavored chewing gum. Fruit flavors which are contemplated for use with the invention include, but are not limited to, banana (amyl acetate), cherry (benzaldehyde), apple (isoamyl isovalerate), pineapple (ethyl butyrate), grape (methyl anthranilate), strawberry (ethyl methyl phenyl glycidate), isoamyl acetate, isobutyl acetate, lemon oil, orange oil, other natural oils, combinations such as the commonly known tutti frutti and bubble gum flavors, and other combinations of the foregoing. A fruit flavor may also contain methyl salicylate and/or vanillin.

A typical bubble gum composition contains between 0.1 and 15.0 weight percent fruit flavor, more commonly between 0.2 and 5.0 weight percent fruit flavor and most commonly about 0.5–2.5 weight percent fruit flavor. A typical fruit-flavored gum composition other than bubble gum contains about the same level of fruit flavor as a typical bubble gum.

The preferred amount of fruit flavor increases with the percentage of the base component in the chewing gum. A typical bubble gum contains between 10 and 90 weight percent base, preferably between 15 and 50 weight percent base and most preferably between 20 and 35 weight percent base. A typical fruit flavored gum other than bubble gum contains between 5 and 95 weight percent base, preferably between 10 and 50 weight percent base and most preferably between 20 and 30 weight percent base. Bubble gum base typically contains higher levels of styrene butadiene rubber and/or high molecular weight polyvinyl acetate, than regular gum base.

Preferably, the L-carvone is preblended with the fruit flavor before the fruit flavor is added to chewing gum, in order to ensure that the flavor enhancing effects of the L-carvone are uniformly dispersed throughout the fruit flavor. Alternatively, the L-carvone may be added to the fruit flavored chewing gum at any point during its formulation. In order to achieve enhanced flavor and sweetness of prolonged duration, the L.carvone should be added to the fruit flavor in an amount of between 0.5–4.0% by weight of the fruit flavor, more preferably between 1.0–3.0% based on the weight of the fruit flavor and most preferably about 1.5% based on the weight of the fruit flavor.

If the concentration of L.carvone is too low, there will not be a noticeable difference in flavor impact or duration. If the concentration of L.carvone is too high, there is a risk that the L.carvone will impart a separate and different flavor to the chewing gum. If spearmint flavor containing L.carvone is used instead of L.carvone, then the spearmint flavor concentration should be high enough to place the L-carvone concentration within the above ranges.

A chewing gum composition generally includes a water soluble bulk portion, a water insoluble chewing gum base portion and one or more flavoring agents. The water soluble portion dissipates with the flavoring agents over a period of time during chewing. The gum base portion is retained in the mouth throughout the chewing process.

The insoluble gum base generally includes elastomers, resins, fats, oils, waxes, softeners and inorganic fillers. The elastomers may include polyisobutylene, isobutylene-isoprene copolymer, styrene butadiene rubber and natural latexes such as chicle. The resins may include polyvinyl acetate and terpene resins. Low molecular weight polyvinyl acetate is a preferred resin. Fats and oils may include animal fats such as lard and tallow, vegetable oils such as soybean and cottonseed oils, hydrogenated and partially hydrogenated vegetable oils, and cocoa butter. Commonly used waxes include petroleum waxes such as paraffin and microcrystalline wax, natural waxes such as beeswax, candellia, carnauba and polyethylene wax. The present invention contemplates the use of any commercially acceptable chewing gum base.

The gum base typically also includes a filler component such as calcium carbonate, magnesium carbonate, talc, dicalcium phosphate and the like; softeners, including glycerol monostearate and glycerol triacetate; and optional ingredients such as antioxidants, colors and emulsifiers. The gum base constitutes between 5–95% by weight of the chewing gum composition.

The water soluble portion of the chewing gum may include softeners, bulk sweeteners, high intensity sweeteners, flavoring agents and combinations thereof. Softeners are added to the chewing gum in order to optimize the chewability and mouth feel of the gum. The softeners, which are also known as plasticizers or plasticizing agents, generally constitute between about 0.5–15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners constitute between 5–95% by weight of the chewing gum, more typically 20–80% by weight of the chewing gum and most commonly 30–60% by weight of the chewing gum. Bulk sweeteners may include both sugar and sugarless sweeteners and components. Sugar sweeteners may include saccharide containing components including but not limited to sucrose, dextrose, maltose, dextrin, dried invert sugar, fructose, levulose, galactose, corn syrup solids, and the like, alone or in combination. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, maltitol, and the like, alone or in combination.

High intensity sweeteners may also be present and are commonly used with sugarless sweeteners. When used, high intensity sweeteners typically constitute between 0.001–5% by weight of the chewing gum, preferably between 0.01–1% by weight of the chewing gum. Typically, high intensity sweeteners are at least 20 times sweeter than sucrose. These may include but are not limited to sucralose, aspartame, salts of acesulfame, alitame, glycyrrhizin, saccharin and its salts, cyclamic acid and its salts, dihydrochalcones, thaumatin, monellin, and the like, alone or in combination.

Combinations of sugar and/or sugarless sweeteners may be used in chewing gum. The sweetener may also function in the chewing gum in whole or in part as a water soluble bulking agent. Additionally, the softener may also provide additional sweetness such as with aqueous sugar or alditol solutions.

Flavoring agents should generally be present in the chewing gum in an amount within the range of about 0.1–15% by weight of the chewing gum, preferably between about 0.2–5.0% by weight of the chewing gum, most preferably between about 0.5–2.5% by weight of the chewing gum. Flavoring agents may include essential oils, synthetic flavors, fruit esters or mixtures thereof including but not limited to oils derived from plants and fruits such as citrus oils and fruit essences. Artificial flavoring agents and components may also be used. Natural and artificial flavoring agents may be combined in any sensorially acceptable fashion.

Optional ingredients such as colors, emulsifiers, pharmaceutical agents and additional flavoring agents may also be included in chewing gum.

Chewing gum is generally manufactured by sequentially adding the various chewing gum ingredients to any commercially available mixer known in the art. After the ingredients have been thoroughly mixed, the gum mass is discharged from the mixer and shaped into the desired form such as by rolling into sheets and cutting into sticks, extruding into chunks, or casting into pellets. Generally, the ingredients are mixed by first melting the gum base and adding it to the running mixer. The gum base may alternatively be melted in the mixer. Color and emulsifiers can be added at this time.

A softener such as glycerin can be added next along with syrup and part of the bulk portion. Further parts of the bulk portion may then be added to the mixer. Flavoring agents are typically added with the final part of the bulk portion. The entire mixing process typically takes from five to fifteen minutes, although longer mixing times are sometimes required. Those skilled in the art will recognize that variations of this mixing procedure, or other mixing procedures, may be followed.

A wide range of changes and modifications of the embodiments of the invention described above will be apparent to persons skilled in the art. The following examples are not to be construed as imposing limitations on the invention, but are included merely to illustrate preferred embodiments.

EXAMPLES 1–4

A fruit flavor was prepared having the following composition:

| Ingredient | % By Weight |
| --- | --- |
| Methyl Salicylate | 2.8 |
| Orange Oil | 31.8 |
| Lemon Oil | 5.2 |
| Isoamyl and Isobutyl Acetate | 32.7 |
| Ethyl Butyrate and Propionate | 22.5 |
| Vanillin | 2.0 |
| Ethyl Methyl Phenyl Glycidate | 1.0 |
| Eugenol | 2.0 |
| TOTAL | 100.0 |

To the above flavor composition was added:

| | |
| --- | --- |
| For Example 1 | 0.0% L-carvone (control) |
| For Example 2 | 0.6% L-carvone |
| For Example 3 | 1.5% L-carvone |
| For Example 4 | 3.0% L-carvone |

These four flavor samples were then used to prepare four chewing gum samples according to the following formula:

| Ingredient | % By Weight |
| --- | --- |
| Bubble Gum Base | 32.5 |
| Sorbitol | 41.0 |
| Coevaporated Lycasin/Glycerin Blend | 9.2 |
| Mannitol | 8.0 |
| Glycerin | 6.4 |
| Flavor | 2.15 |
| Aspartame | 0.3 |
| Glycyrrhizin | 0.2 |
| Color | 0.15 |
| 10% Salt Solution | 0.1 |
| TOTAL | 100.00 |

The four chewing gum samples were evaluated by a 10-member expert sensory panel for flavor and sweetness, on scales of 1 to 12, with higher numbers indicating higher flavor impact and higher sweetness impact, respectively. For each gum sample, the intensity of flavor and sweetness were rated at several time intervals during a 12-minute chew. The results are shown in FIG. 1 for flavor and FIG. 2 for sweetness.

Referring to FIG. 1, the flavor intensities for the L-carvone containing samples of Examples 2–4 were higher than for the control sample of Example 1, for chewing times of less than nine minutes. The differences between the samples became small at chewing times of nine minutes and longer.

Referring to FIG. 2, the sweetness impact for the L-carvone containing samples were generally higher than for the control at all times, although there was some overlap between the trend lines at different times.

Based on the foregoing, it was concluded that the addition of small amounts of L.carvone to fruit flavor causes noticeable improvements in flavor and sweetness intensity and duration for fruit-flavored chewing gum.

EXAMPLES 5 AND 6

For Example 5, 97.0% by weight of the same fruit flavor prepared for Examples 1–4 was combined with 1.5% by weight L-carvone and 1.5% by weight Linalool. The blend was added into the same chewing gum formulation used in Examples 1–4.

For Example 6, 97.0% by weight of the fruit flavor prepared for Examples 1–4 was combined with 1.5% by weight menthol and 1.5% by weight Linalool. The blend was added into the same chewing gum formulation used in Examples 1–4.

The chewing gum samples of Examples 5 and 6 were consumer blind-tested by 75 people against Carefree Sugarless Bubble Gum (i.e. a control having a similar formulation as the gum sample of Example 1). The gum sample of Example 6 showed no differences in flavor intensity, sweetness or flavor duration. However, the gum sample of Example 5 showed significantly improved flavor and sweetness and longer flavor duration. These results indicate that the invention requires the use of L-carvone, the primary ingredient in spearmint oil, and cannot be practiced using menthol, which is the primary ingredient in peppermint oil.

While the embodiments of the invention disclosed herein are presently considered to be preferred, various modifications and improvements can be made without departing from the spirit and scope of the invention. The scope of the invention is indicated in the appended claims, and all changes that fall within the meaning and range of equivalency of the claims are intended to be embraced therein.

We claim:

1. A non-mint flavored, fruit-flavored chewing gum, comprising:
   a water soluble bulk portion;
   a water insoluble chewing gum base portion;
   a fruit flavoring agent in an amount of about 0.1-15 percent of the weight of the chewing gum; and
   L-carvone in an amount of about 0.5-4.0 percent of the weight of the fruit flavoring agent.

2. The chewing gum of claim 1 wherein the L-carvone is present in an amount of about 1.0-3.0 percent of the weight of the fruit flavoring agent.

3. The chewing gum of claim 2 wherein the L-carvone is present in an amount of about 1.5 percent of the weight of the fruit flavoring agent.

4. The chewing gum of claim 1, wherein the fruit flavoring agent is present in an amount of about 0.2-5.0 percent of the weight of the chewing gum.

5. The chewing gum of claim 1 wherein the fruit flavor is present in an amount of about 0.5-2.5 percent of the weight of the chewing gum.

6. The chewing gum of claim 1 wherein the L-carvone has been preblended with the fruit flavoring agent.

7. The chewing gum of claim 1 wherein the fruit flavoring agent is selected from the group consisting of lemon oil, orange oil, amyl acetate, benzaldehyde, isoamyl isovalerate, ethyl butyrate, methyl anthranilote, isoamyl acetate, isobutyl acetate, ethyl methyl phenyl glycidate, and combinations thereof.

8. The chewing gum of claim 1 wherein the base comprises an elastomer selected from the group consisting of polyisobutylene, isobutylene-isoprene copolymer, styrene butadiene rubber, natural latexes, and combinations thereof.

9. The chewing gum of claim 1 wherein the water soluble bulk portion comprises a bulk sweetener selected from the group consisting of sucrose, dextrose, maltose, dextrin, dried invert sugar, fructose, levulose, galactose, corn syrup solids, and combinations thereof.

10. The chewing gum of claim 1 wherein the water soluble bulk portion comprises a sugar alcohol selected from the group consisting of sorbitol, mannitol, xylitol, hydrogenated starch hydrolysates, maltitol, and combinations thereof.

11. The chewing gum of claim 1 wherein the water soluble bulk portion comprises a high intensity sweetener selected from the group consisting of sucralose, aspartame, salts of acesulfame, alitame, glycyrrhizin, saccharin and its salts, cyclamic acid and its salts, dihydrochalcones, thaumatin, monellin, and combinations thereof.

12. A non-mint flavored bubble gum comprising:
    a water soluble bulk portion;
    between 15-50 weight percent gum base;
    between 0.2-5.0 weight percent fruit flavor; and
    L-carvone in an amount of between 0.5-4.0 percent of the weight of the fruit flavor.

13. The bubble gum of claim 12 comprising between 20-35 weight percent gum base.

14. The bubble gum of claim 12 comprising between 0.5-2.5 weight percent fruit flavor.

15. The bubble gum of claim 12 comprising L-carvone in an amount of between 1.0-3.0 percent of the weight of the fruit flavor.

16. The bubble gum of claim 15 comprising L-carvone in an amount of about 1.5 percent of the weight of the fruit flavor.

17. A method of making a non-mint flavored, fruit-flavored chewing gum, comprising the steps of:
    providing a quantity of chewing gum base;
    adding a water soluble portion comprising at least a sweetener;
    adding a fruit flavoring agent in an amount of between 0.1-15 percent by weight of the chewing gum;
    adding L-carvone in an amount of between 0.5-4.0 percent by weight of the fruit flavoring agent; and
    mixing the chewing gum base, water soluble portion, fruit flavoring agent and L-carvone together to form a gum mass.

18. The method of claim 17 further comprising the step of separately mixing the L-carvone with the fruit flavoring agent.

19. The method of claim 17 wherein the L-carvone is added in an amount of between 1.0-3.0 weight percent of the fruit flavoring agent.

20. The method of claim 19 wherein the L-carvone is added in an amount of about 1.5 weight percent of the fruit flavoring agent.

* * * * *

UNITED STATES PATENT AND TRADEMARK OFFICE
CERTIFICATE OF CORRECTION

PATENT NO. : 5,158,790

DATED : October 27, 1992

INVENTOR(S) : DAVID L. WITKEWITZ et al.

It is certified that error appears in the above-identified patent and that said Letters Patent is hereby corrected as shown below:

On title page, item [73]
after "Wrigley" delete ",".

Column 3, line 44, please delete "L.carvone" and substitute therefor --L-carvone--.

Column 3, line 50, please delete "L.carvone" and substitute therefor --L-carvone--.

Column 3, line 52, please delete "L.carvone" and substitute therefor --L-carvone--.

Column 3, line 53, please delete "L.carvone" and substitute therefor --L-carvone--.

Column 3, line 55, please delete "L.carvone" and substitute therefor --L-carvone--.

Column 3, lines 55-56, please delete "L.carvone" and substitute therefor --L-carvone--.

Column 6, line 35, please delete "L.carvone" and substitute therefor --L-carvone--.

UNITED STATES PATENT AND TRADEMARK OFFICE
CERTIFICATE OF CORRECTION

PATENT NO. : 5,158,790

DATED : October 27, 1992

INVENTOR(S) : DAVID L. WITKEWITZ et al.

It is certified that error appears in the above-identified patent and that said Letters Patent is hereby corrected as shown below:

Col. 7,

Claim 8, line 32, before "base" please insert --gum--.

Signed and Sealed this

Third Day of May, 1994

*Attest:*

BRUCE LEHMAN

*Attesting Officer*      *Commissioner of Patents and Trademarks*